United States Patent [19]

Russell et al.

[11] 4,370,153
[45] Jan. 25, 1983

[54] APPARATUS FOR CLEANING FILTER BAGS

[75] Inventors: Benjamin Russell; Jerry W. Scott, both of Alexander City, Ala.

[73] Assignee: Econ Company, Alexander City, Ala.

[21] Appl. No.: 320,466

[22] Filed: Nov. 12, 1981

[51] Int. Cl.³ ............................................ B01D 46/04
[52] U.S. Cl. ................................ 55/304; 55/341 NT; 55/422
[58] Field of Search .......... 55/299, 300, 304, 341 NT, 55/422

[56] References Cited

U.S. PATENT DOCUMENTS

| | | | |
|---|---|---|---|
| 839,658 | 12/1906 | Shires | 55/304 X |
| 1,295,711 | 2/1919 | Dod | 55/304 X |
| 1,761,377 | 6/1930 | Waring | 55/304 |
| 3,377,781 | 4/1968 | Hammond | 55/304 X |

FOREIGN PATENT DOCUMENTS

| | | | |
|---|---|---|---|
| 167767 | 8/1950 | Austria | 55/422 |
| 157242 | 7/1903 | Fed. Rep. of Germany | 55/304 |

Primary Examiner—Kathleen J. Prunner

Attorney, Agent, or Firm—Woodford R. Thompson, Jr.

[57] ABSTRACT

Apparatus for filtering entrained particulate matter from a gaseous fuel embodies an upstanding housing having a hopper adjacent its lower end for receiving dislodged particulate matter. At least one upstanding, porous tubular filter bag is mounted within the housing. The ends of the filter bag are attached to the housing with its length being greater than the distance between the points of attachment of the ends to the housing. An inlet communicates with one end of the filter bag for introducing a gaseous fluid with particulate matter entrained therein. Particulate matter carried by the gaseous fluid is deposited on the inner surface of the filter bag with cleaned gaseous fluid passing therethrough. An outlet communicates with the housing and discharges the cleaned gaseous fluid. An actuator is operatively connected to the filter bag intermediate its ends for imparting longitudinal reciprocatory movement thereto to relax and extend the upper and lower portions of the bag and dislodge particulate matter therefrom.

7 Claims, 4 Drawing Figures

APPARATUS FOR CLEANING FILTER BAGS

BACKGROUND OF THE INVENTION

This invention relates to apparatus for filtering particulate matter from a gaseous fluid and more particularly to improved apparatus for cleaning upstanding filter bags mounted longitudinally within a housing to collect particulate matter on the inner surface thereof while permitting clean gas to pass therethrough.

Heretofore in the art to which our invention relates, particulate matter entrained in a gaseous fluid has usually been collected on filter bags by two different methods. In one method the particulate matter is collected on the outer surface of the bag while in the other method the particulate matter is collected on its inner surface. An elongated wire cage is required with the first method to prevent the bag from collapsing when the gaseous fluid engages the outer surface of the filter bag. With both methods, each filter bag must be properly tensioned to provide a maximum filtering surface and to compensate for any variation in length of the bag created by temperature and humidity changes within the bag house.

Heretofore, it has been the usual practice to employ conventional mechanical or pneumatic devices to clean the filter bags. Such mechanical devices usually employ shaking, vibrating or oscillating mechanisms to jar collected particulate matter loose from the filter bags. An electric motor is usually operatively connected to wear-proned cams and other linkage members to produce the shaking, vibrating or oscillating motion. Mechanical devices of this type require considerable time, labor and maintenance to assure proper operation thereof. Also, deterioration and wear of filter bags has been experienced with such mechanical shakers and vibrators due to the fact that the bags rub against their supporting cages during the cleaning cycle.

While pneumatic devices may eliminate the usage of wear-proned cams and other linkage members, such devices require the use of expensive pumps, motors, valves and pneumatic lines. Also, to clean filter bags with a pneumatic device, the flow of the gaseous fluid carrying the entrained particulate matter must always be shut off in the compartment of the bag house being cleaned. Air or gas is then introduced to bring about a reverse pulsation of air within this compartment to vibrate and shake the bags. Most bag houses with which we are familiar have been used to clean a gaseous fluid containing considerable amounts of carbon particles and very little oxygen. Accordingly, the introduction of reverse air or gas flow into the compartment being cleaned combined with the carbon particles collected on the filter bags may create a highly flamable mixture under certain conditions. That is, with an excessive temperature rise or a spark within the compartment being cleaned, the mixture could ignite and burn the filter bags. This is the major cause for the phenomenon known in the art as "bag house burn-out".

Conventional mechanical and pneumatic cleaning devices with which we are familiar are disclosed in the following U.S. patents: No. 2,137,254; No. 3,008,543; No. 3,377,781; No. 3,939,971; No. 4,113,455; and No. 4,157,901.

SUMMARY OF THE INVENTION

In accordance with our invention, we overcome the above and other difficulties by providing improved apparatus for cleaning filter bags which utilizes longitudinal reciprocatory movement of an intermediate portion of the filter bag to dislodge particulate matter collected thereon. Our improved apparatus is simple of construction, economical of manufacture and requires considerably less maintenance than conventional mechanical and pneumatic cleaning devices with which we are familiar. Also, our improved apparatus eliminates filter bag support cages which are required when dislodging particulate matter from the outer surface of a filter bag and eliminates the introduction of air or gas to produce a reverse pulsation of air flow into the bag house to clean the filter bags. In some cases, our improved apparatus may be adapted to clean active, on line filter bags thus eliminating the periodic shut down and isolation of each compartment of the bag house for pneumatic or mechanical cleaning of the filter bags contained therein. Furthermore, in accordance with our invention, the length or height of the filter bag is over 50% greater than the height of its housing whereby the overall height of the housing is reduced to a minimum.

Our improved apparatus for cleaning filter bags embodies an upstanding housing having a hopper adjacent its lower end for receiving dislodged particulate matter. At least one upstanding porous tubular filter bag is mounted within the housing. The ends of the filter bag are attached to the housing with the length of the bag being greater than the distance between the points of attachment of the ends to the housing. Means is provided for introducing the gaseous fluid having particulate matter entrained therein into one end of the filter bag so that the particulate matter is deposited on the inner surface of the filter bag with clean gaseous fluid passing therethrough. An outlet communicates with the housing for discharging the clean gaseous fluid. An actuator member is operatively connected to the filter bag intermediate the ends thereof for imparting longitudinal reciprocatory movement thereto whereby upper and lower portions of the filter bag are alternately relaxed and extended to dislodge particulate matter from the inner surface thereof. That is, the diameter of the portion of the filter bag extended is reduced abruptly to cause a sudden release of particulate matter inwardly of the filter bag due to the popping action imparted to the extended portion of the bag.

BRIEF DESCRIPTION OF THE DRAWINGS

Apparatus embodying features of our invention is illustrated in the accompanying drawings, forming a part of this application, in which.

DETAILED DESCRIPTION

Figure 1:
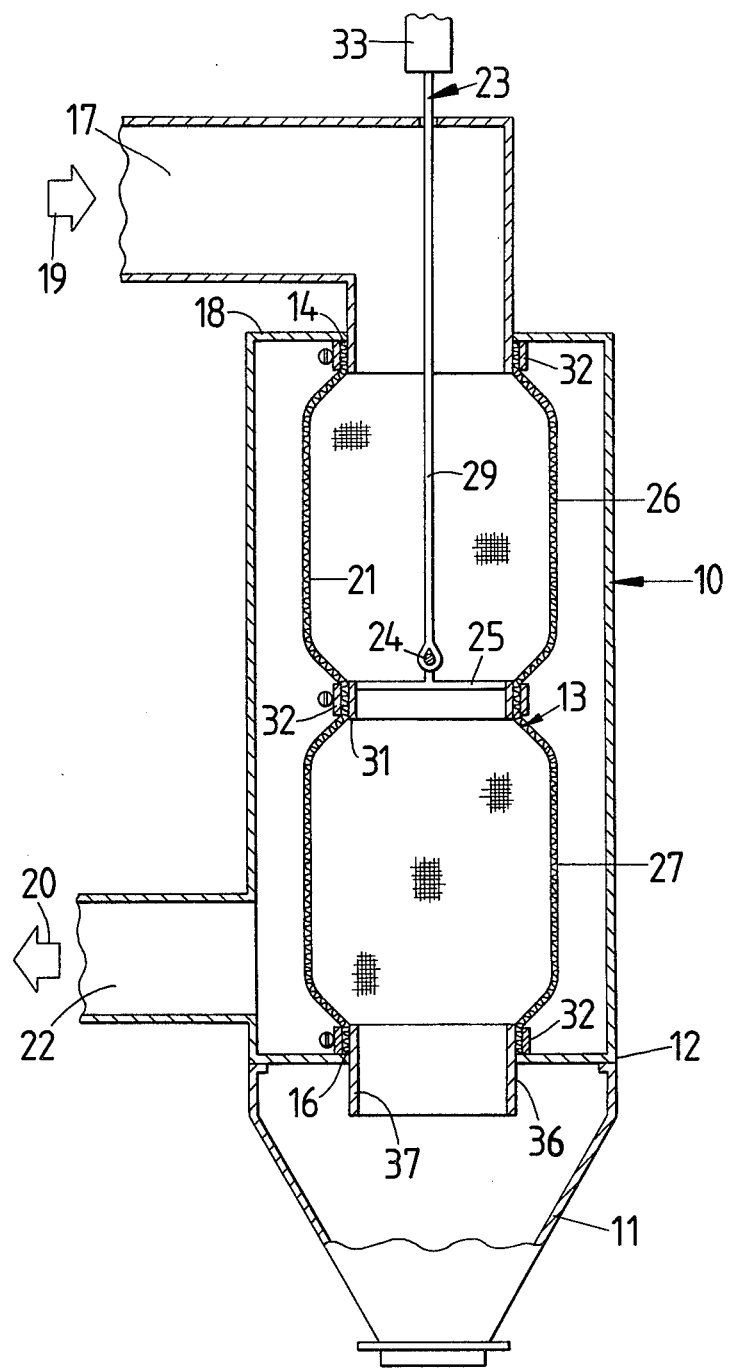
FIG. 1 is a vertical sectional view showing our improved apparatus with the filter bag in the filtering position.

Referring now to the drawings for a better understanding of our invention, we show in FIG. 1 an upstanding housing 10 having a discharge hopper 11 adjacent its lower end 12 for receiving and discharging collected particulate matter. An upstanding porous, tubular filter bag 13 is mounted within the housing 10, as shown. The upper and lower ends 14 and 16, respectively, of the filter bag 13 are attached to the housing 10, with the length of the filter bag 13 being greater than the distance between the points of attachment of the ends of the filter bag to the housing. While we have shown only one filter bag 13 mounted within the housing 10, it will be apparent that our improved cleaning apparatus will be adapted for use with an upstanding housing having a plurality of filter bags mounted therein.

An inlet 17 communicates with the upper end 18 of the housing 10 for introducing into the upper end 14 of the filter bag 13 a gaseous fluid, such as air, having particulate matter entrained therein. The particulate matter carried by the gaseous fluid flows in the direction indicated by arrow 19 and is deposited on the inner surface 21 of the filter bag 13 while the clean gaseous fluid passes through the filter bag. A suitable outlet 22 communicates with the housing 10 adjacent its lower end 12 for discharging the cleaned gaseous fluid in the direction indicated by arrow 20.

Figure 2:
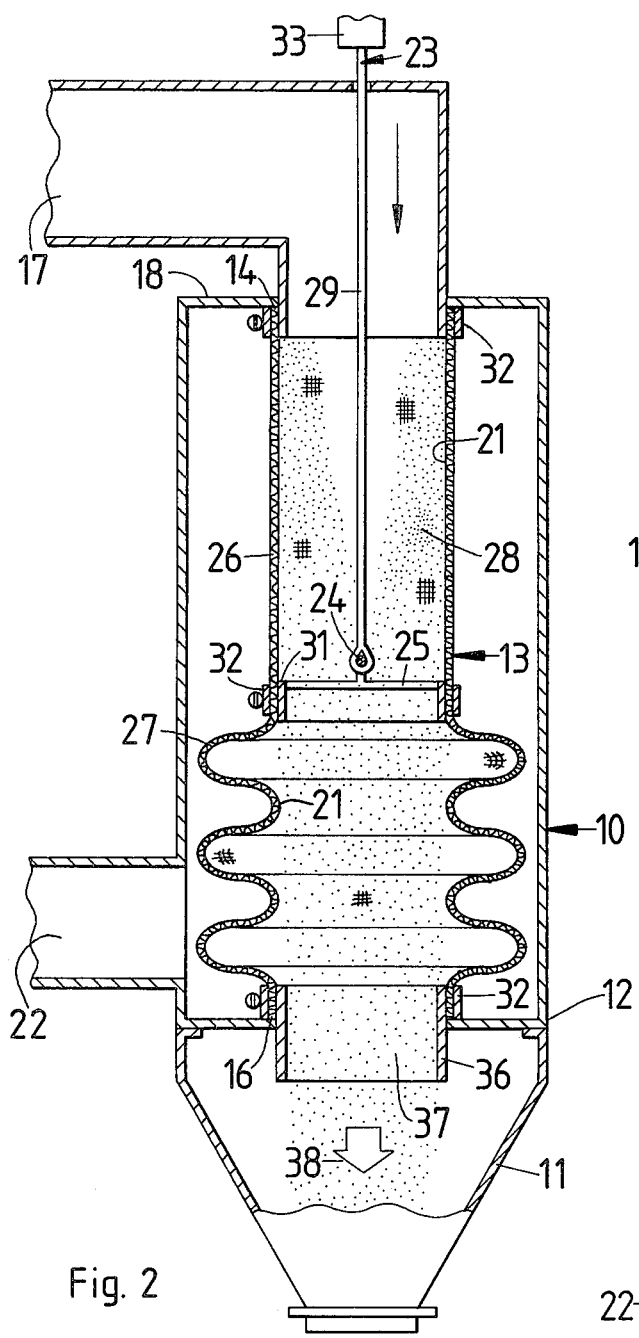
FIG. 2 is a sectional view corresponding to FIG. 1 showing the filter bag in the cleaning position with the bag being moved in a downward direction to relax its lower portion and extend its upper portion.
Figure 3:
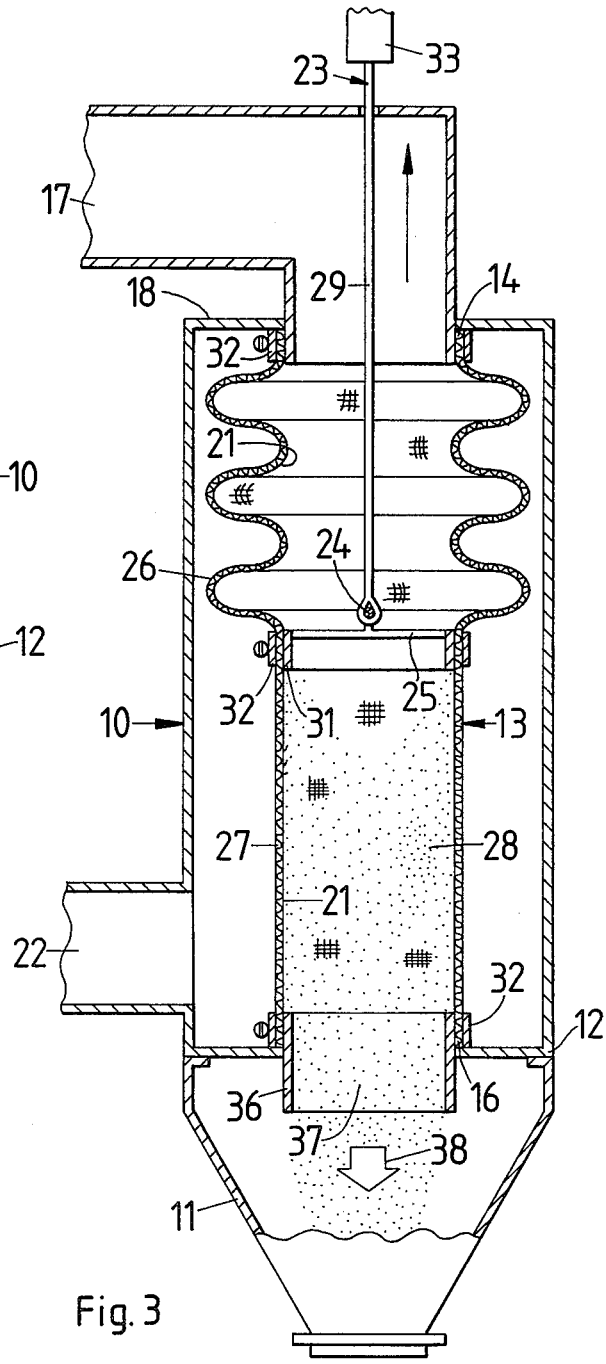
FIG. 3 is a sectional view corresponding to FIGS. 1 and 2 showing the filter bag in the cleaning position with the bag being moved in an upward direction to relax its upper portion and extend its lower portion; and, FIG. 4 is a fragmental sectional view showing a modified form of our invention.

One end of an elongated actuating member 23 is operatively connected, as at 24, to a transverse bar 25 which in turn is connected to the filter bag 13 intermediate its ends, as shown. The actuating member 23 is moved axially to impart longitudinal reciprocatory movement to an intermediate portion of the filter bag 13 selectively in a first direction to relax or slacken the upper portion 26 of the filter bag 13 and extend the lower portion 27 whereby particulate matter 28 is dislodged from the inner surface 21, as shown in FIG. 3. Upon reciprocating the actuating member 23 in the opposite direction the filter bag 13 is moved in a second direction to relax or slacken its lower portion 27 and extend its upper portion 26 whereby particulate matter 28 is dislodged from the inner surface 21 as shown in FIG. 2. The relaxed or slackened portion of the filter bag moves outwardly in a direction perpendicular to the direction of movement of the actuating member 23, as shown in FIGS. 2 and 3, whereby the effective diameter of the relaxed portion of the filter bag is increased. Accordingly, as each portion of the filter bag is moved from its relaxed or larger diameter position to its extended or smaller diameter position, there is an abrupt change in the effective diameter of the extended portion of the bag which causes a sudden release and accelerated movement of the particles inwardly of the bag due to the popping action imparted to the extended portion of the bag.

The actuating member 23 is shown as being in the form of an elongated rod-like member 29 which extends axially and inwardly of the filter bag 13 and is operatively connected at its lower end to the longitudinal mid poriton of the filter bag 13 by a connector member, which may be in the form of cooperating inner and outer clamping bands 31 and 32, respectively. The transverse bar 25 is carried by the inner clamping band 31 and is connected to the lower end of the elongated rod-like member 29, as shown. The upper end of the rod-like member 29 is operatively connected to a conventional reciprocating drive unit indicated diagrammatically at 33. In view of the fact that suitable reciprocatory drive units are well known in the art, no further description is deemed necessary.

Figure 4:
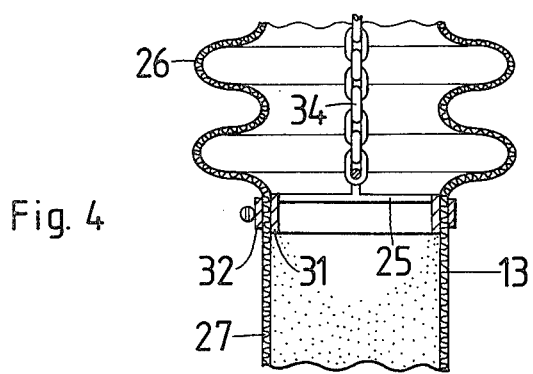

Instead of using a rod-like member 29, an elongated flexible member 34, such as a chain, cable or the like, may be operatively connected to an intermediate portion of the filter bag 13 to move it in an upward direction, as shown in FIG. 4. Gravity is then employed to urge the filter bag 13 downwardly, whereby reciprocatory motion is imparted to the intermediate portion of the filter bag as described hereinabove.

As shown in the drawings, an outer clamping band 32 may be used to cooperate with the discharge end of the inlet 17 and the outer surface of an outlet 36 to secure the upper and lower ends 14 and 16, respectively, of the filter bag to the housing 10. The clamping bands 31 and 32 are preferably of a diameter less than the diameter of the filter bag 13 whereby the fabric forming the filter bag is gathered in pleats at the points of attachment of the clamping bands to the filter bag. Accordingly, maximum filtering surfaces are provided by the pleats.

The outlet 36 at the lower end 12 of the housing 10 is provided with a discharge passageway 37 to permit the particulate matter 28 dislodged from the inner surface 21 of the filter bag 13 to fall by gravity into the hopper 11. Since the flow of the particulate matter 28 is in a downward direction, as indicated by the arrow 38 in FIGS. 2 and 3, such flow is concurrent with the flow of the gaseous fluid entering the filter bag 13 and is aided by gravity. This concurrent flow aids in the removal of the particulate matter 28. Also, in some cases the flow of the gaseous fluid does not have to be diverted or shut off to clean the filter bag as is required with prior art apparatus used to clean filter bags with particulate matter captured on the outer surface thereof.

From the foregoing description, the operation of our improved apparatus for cleaning filter bags will be readily understood. With the filter bag 13 mounted within the housing 10 as shown in FIG. 1, gaseous fluid having particulate matter entrained therein is introduced through the inlet 17 into the upper end 14 of the filter bag 13. The particulate matter 28 carried by the gaseous fluid is then deposited on the inner surface 21 of the filter bag while the clean gaseous fluid passes through the filter bag and is discharged through the outlet 22. As particulate matter accumulates on the inner surface 21 of the filter bag, the pressure differential across the filter bag increases to a predetermined level. This pressure differential may be employed to activate a suitable pressure responsive device which in turn energizes the reciprocating drive unit 33 to clean the filter bag 13. That is, the reciprocating drive unit 33 reciprocates the rod-like member 29 or the flexible member 34 selectively in a first direction to relax the upper portion 26 of the filter bag 13 and to extend the lower portion 27 thereof so that the particulate matter 28 is dislodged from the inner surface 21 thereof, as shown in FIGS. 3 and 4. Upon downward reciprocatory movement of the rod-like member 29, the lower portion 27 of the filter bag 13 is relaxed and the upper portion 26 thereof is extended whereby the particulate matter 28 is dislodged from the inner surface 21, as shown in FIG. 2. The extending and relaxing of the upper and lower portions 26 and 27, respectively, of the filter bag 13 is continued until the filter bag is cleaned. Since the flow of gaseous fluid into the upper end 14 of the filter bag 13 is concurrent with the direction of discharge of the particulate matter into the hopper 11, the filter bag 13 is also cleaned by the gaseous fluid flowing continuously through the filter bag. Accordingly, the isolation and shutting off of the flow of gaseous fluid into the compartment of the bag house being cleaned may be eliminated. Also, our improved apparatus eliminates the necessity of providing a valve in the bag house outlet for the clean gaseous fluid which must be closed during the cleaning operation where conventional shakers and vibrators are employed.

From the foregoing, it will be seen that we have devised improved apparatus for cleaning filter bags which utilizes longitudinal reciprocatory movement of the filter bag to dislodge particulate matter collected on its inner surface. Also, our improved apparatus is simple of construction, economical of manufacture and eliminates filter bag support cages heretofore required with apparatus that captured particulate matter on the outer surface of the filter bag. Furthermore, our improved apparatus eliminates the introduction of reverse air or gas flow in the bag house to clean the filter bags, which is the major cause of bag house burn-out.

While we have shown our invention in but two forms, it will be obvious to those skilled in the art that it is not so limited, but is susceptible of various other changes and modifications without departing from the spirit thereof.

What we claim is:

1. Apparatus for filtering entrained particulate matter from a gaseous fluid comprising:
   (a) an upstanding housing having discharge means adjacent the lower end thereof for removing particulate matter,
   (b) at least one upstanding porous tubular filter bag mounted within said housing with the ends of said filter bag being attached to said housing and with the length of said bag being greater than the distance between the points of attachment of said ends to said housing,
   (c) means for introducing said gaseous fluid with particulate matter entrained therein into one end of said filter bag so that said particulate matter is deposited on the inner surface of said filter bag,
   (d) an outlet communicating with said housing for discharging said clean gaseous fluid,
   (e) a reciprocating drive means, and
   (f) actuator means operatively connected to said reciprocating drive means and to said filter bag intermediate the ends thereof to impart longitudinal reciprocatory movement to the filter bag selectively in a first direction to relax the upper portion of said filter bag and extend the lower portion thereof to dislodge particulate matter therefrom and in a second direction to relax the lower portion of said filter bag and extend the upper portion thereof to dislodge particulate matter therefrom.

2. Apparatus for filtering entrained particulate matter from a gaseous fluid as defined in claim 1 in which the uppermost end of said filter bag is in communication with said means for introducing said gaseous fluid with particulate matter entrained therein and its lowermost end is in communication with said discharge means for removing said particulate matter.

3. Apparatus for filtering entrained particulate matter from a gaseous fluid as defined in claim 1 in which a connector member is operatively connected to said actuator means adjacent the longitudinal mid portion of said filter bag.

4. Apparatus for filtering entrained particulate matter from a gaseous fluid as defined in claim 3 in which said connector member is an annular band-like member detachably connected to said filter bag.

5. Apparatus for filtering entrained particulate matter from a gaseous fluid as defined in claim 3 in which said actuator means for imparting longitudinal reciprocatory movement to said filter bag comprises an elongated rod-like member operatively connected at one end to said connector member and operatively connected at its other end to said reciprocating drive means.

6. Apparatus for filtering entrained particulate matter from a gaseous fluid as defined in claim 5 in which said one end of said rod-like member extends axially and inwardly of said filter bag and is detachably connected to said connector member.

7. Apparatus for filtering entrained particulate matter from a gaseous fluid as defined in claim 3 in which said filter bag is mounted vertically within said upstanding housing with said actuator means for imparting longitudinal reciprocatory movement to said filter bag comprising an elongated flexible member operatively connected at one end to said connector member and operatively connected at its other end to said reciprocating drive means.

* * * * *